(12) United States Patent
Mitter et al.

(10) Patent No.: US 7,388,357 B2
(45) Date of Patent: Jun. 17, 2008

(54) METHOD AND APPARATUS FOR REDUCING INPUT SUPPLY RIPPLE IN A DC-DC SWITCHING CONVERTER

(75) Inventors: Chang Su Mitter, Moorpark, CA (US); Michael Stuart McPartlin, Scotland (GB)

(73) Assignee: Semtech Corporation, Camarillo, CA (US)

(*) Notice: Subject to any disclaimer, the term of this patent is extended or adjusted under 35 U.S.C. 154(b) by 343 days.

(21) Appl. No.: 11/146,525

(22) Filed: Jun. 6, 2005

(65) Prior Publication Data

US 2005/0275387 A1 Dec. 15, 2005

Related U.S. Application Data

(60) Provisional application No. 60/580,057, filed on Jun. 15, 2004.

(51) Int. Cl.
*G05F 1/40* (2006.01)
*G05F 1/56* (2006.01)

(52) U.S. Cl. ..................... 323/282; 323/285

(58) Field of Classification Search ............... 323/265, 323/268, 270, 271, 273–276, 281, 282, 285
See application file for complete search history.

(56) References Cited

U.S. PATENT DOCUMENTS 5,629,609 A * 5/1997 Nguyen et al. ............. 323/269
6,046,577 A * 4/2000 Rincon-Mora et al. ..... 323/282
6,960,907 B2 * 11/2005 Poss .......................... 323/316
6,977,490 B1 * 12/2005 Zhang et al. ............... 323/280
7,091,710 B2 * 8/2006 Yang et al. ................. 323/282
7,109,897 B1 * 9/2006 Levesque .................... 341/67
7,173,402 B2 * 2/2007 Chen et al. ................. 323/280
7,205,827 B2 * 4/2007 Leung et al. ............... 327/540

FOREIGN PATENT DOCUMENTS

JP        2003009515     * 1/2003

* cited by examiner

*Primary Examiner*—Matthew V Nguyen
(74) *Attorney, Agent, or Firm*—O'Melveny & Myers LLP

(57) ABSTRACT

A power system comprising a front end regulator coupled to an input supply voltage (Vin) and providing a regulated input supply voltage (Vbp). The front end regulator compares the input supply voltage (Vin) and the regulated input supply voltage (Vbp) and maintains a substantially constant voltage difference between the input supply voltage (Vin) and the regulated input supply voltage (Vbp) to thereby reduce ripple of the input supply voltage (Vin). A DC-DC switching mode power converter is operatively coupled to the front end regulator and receives the regulated input supply voltage (Vbp). The DC-DC switching mode power converter thereby provides a regulated output voltage (Vout).

7 Claims, 3 Drawing Sheets

METHOD AND APPARATUS FOR REDUCING INPUT SUPPLY RIPPLE IN A DC-DC SWITCHING CONVERTER

RELATED APPLICATION DATA

This patent application claims priority pursuant to 35 U.S.C. § 119(e) to provisional patent application Ser. No. 60/580,057, filed Jun. 15, 2004.

BACKGROUND OF THE INVENTION

1. Field of the Invention

The present invention relates to switching mode power converter circuits, and more particularly, to a switching mode power converter having a front end regulator to control input supply ripple.

2. Description of Related Art

Switching mode DC-to-DC power converters are commonly used in the electronics industry to convert an available direct current (DC) level voltage to another DC level voltage. A switching mode converter provides a regulated DC output voltage to a load by selectively storing energy in an output inductor coupled to the load by switching the flow of current into the output inductor. A buck converter is a particular type of switching mode converter in which an input DC voltage is coupled in series with a periodically driven switch to produce a rectangular waveform at a phase node. The rectangular waveform is rectified by a diode. An output filter including an inductor and capacitor produces a smoothed DC output voltage from the rectified rectangular waveform.

More particularly, the buck converter chops the input DC voltage to achieve an output DC voltage that is lower than the input DC voltage. The input supply current approximates a square wave oscillating at the chopping frequency, the peak of which is controlled by the output load current. Input supply voltage ripple is formed by the current waveform passing through the equivalent series resistance (ESR) of the input supply decoupling capacitor and the copper trace impedance at the chopping frequency, and the equivalent series inductance (ESL) of the input supply decoupling capacitor and the copper trace inductance due to the rate of change of the current signal (dI/dtr). It is desirable to attenuate the input supply voltage ripple to prevent it from propagating to other integrated circuits powered from the same supply.

One way to attenuate the ripple is to include an RC (resistor capacitor) based low-pass filter to attenuate the switching noise produced by the integrated circuits of the system supply. A drawback of this approach is that a resistor based system would have a load dependant dropout the magnitude of which would increase with load current; i.e., the higher the voltage drop, the worse the efficiency. Another way to attenuate the ripple is to include a high value, lower ESR specialist capacitor from the system supply to ground to decouple the switching noise from the system supply. A drawback of this approach is that very low ESR capacitors generally have a cost premium associated with them.

Accordingly, it would be desirable to provide an improved way to control input supply ripple in a switching mode power converter.

SUMMARY OF THE INVENTION

The present invention provides a switching mode power converter having substantially reduced input supply voltage ripple. The switching mode power converter includes a front end low drop out regulator that sources a near DC current from the input supply voltage, as compared with the near square wave supplied to the switching mode power converter.

In an embodiment of the invention, a power system comprises a front end regulator coupled to an input supply voltage (Vin) and provides a regulated input supply voltage (Vbp). The front end regulator compares the input supply voltage (Vin) and the regulated input supply voltage (Vbp) and maintains a substantially constant voltage difference between the input supply voltage (Vin) and the regulated input supply voltage (Vbp) to thereby reduce ripple of the input supply voltage (Vin). A DC-DC switching mode power converter is operatively coupled to the front end regulator and receives the regulated input supply voltage (Vbp). The DC-DC switching mode power converter thereby provides a regulated output voltage (Vout).

More particularly, the front end regulator comprises an error amplifier comparing the input supply voltage (Vin) and regulated input supply voltage (Vbp), and producing an error signal used to modulate the voltage difference between the input supply voltage (Vin) and the regulated input supply voltage (Vbp). The front end regulator further comprises an MOS device operatively coupled to the error amplifier, the MOS device including a gate terminal receiving the error signal, a source terminal coupled to the input supply voltage (Vin), and a drain terminal coupled to the regulated input supply voltage (Vbp). The front end regulator further comprises a low drop-out regulator. The MOS device further comprises a PMOS pass device. A reference voltage with respect to the input supply voltage (Vin) is coupled to an inverting input of the error amplifier.

A more complete understanding of the switching mode power converter having a front end regulator to control input supply ripple will be afforded to those skilled in the art, as well as a realization of additional advantages and objects thereof, by a consideration of the following detailed description of the preferred embodiment. Reference will be made to the appended sheets of drawings, which will first be described briefly.

DETAILED DESCRIPTION OF THE PREFERRED EMBODIMENT

The present invention satisfies the need for an improved way to control input supply ripple in a switching mode power converter.

Figure 1:
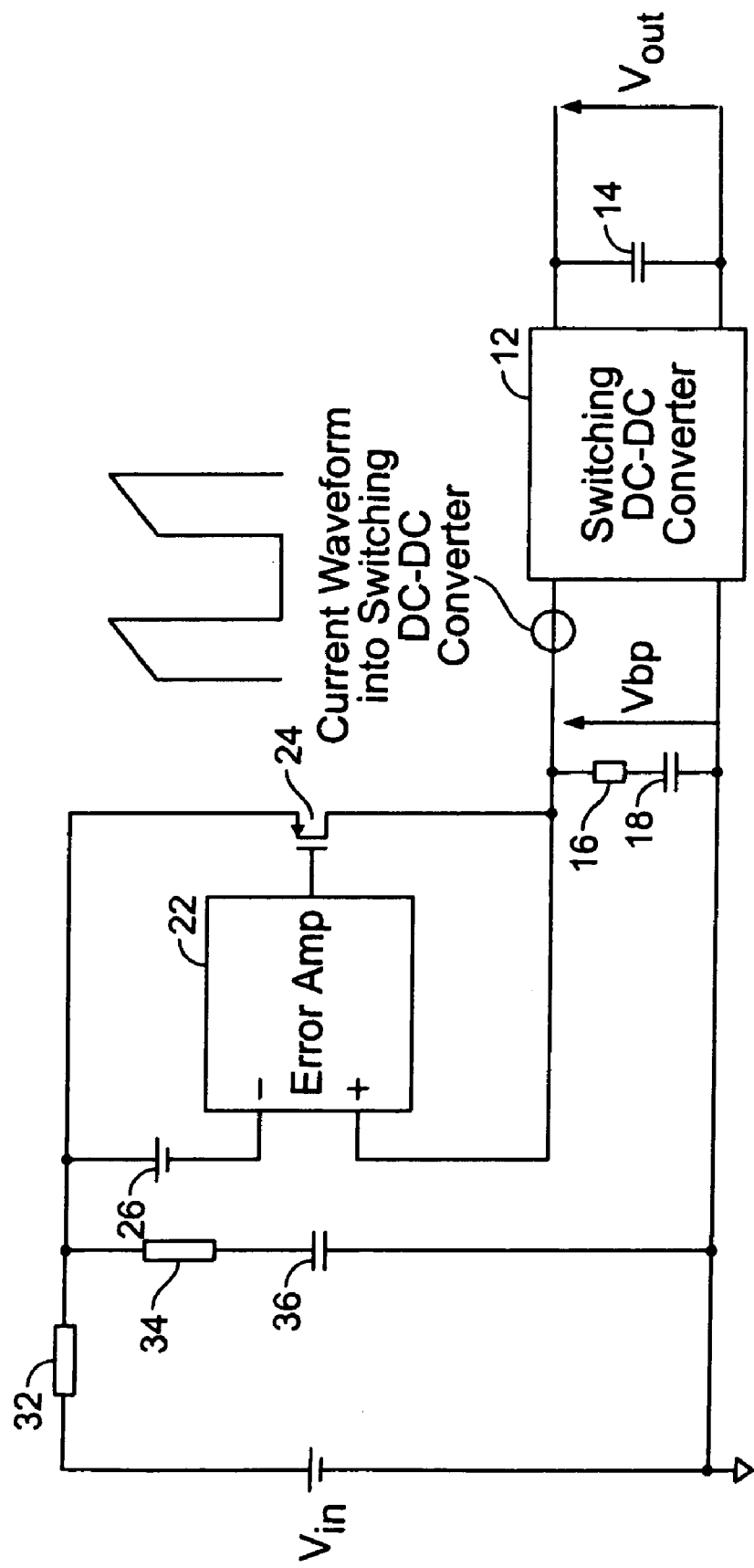
FIG. 1 is a schematic diagram of a front end regulator for switching mode power converter in accordance with an embodiment of the invention.

FIG. 1 illustrates a DC-DC switching mode power converter 12 having a front end low drop-out (LDO) regulator in accordance with the present invention. The DC-DC converter 12 provides an output voltage (Vout) to a load across an output capacitor 14. An input supply (Vin) is shown along with the copper trace impedance 32 and equivalent series resistance 34 of the input supply decoupling capacitance 36. The regulated input supply voltage (Vbp) to the DC-DC converter 12 is defined across an output decoupling capacitor 18 and equivalent series resistance 16. As will be further described below, the front end LDO regulator pre-regulates the input supply voltage (Vbp) to minimize the input supply voltage ripple (Vin) (peak-to-peak).

The front end LDO regulator includes an error amplifier 22 and a PMOS pass device 24. The front end LDO regulator operates with a fixed "drop out voltage" (i.e., the voltage across the power device 24 remains constant). A reference voltage (e.g., 300 mV) with respect to the positive supply voltage (Vin) is provided by voltage supply 26 as one of the inputs to the error amplifier 22. The non-inverting input of the error amplifier 22 is connected to the output decoupling capacitor 18. The error amplifier 22 compares the two input voltages and modulates the gate of the PMOS pass device 24 such that both inputs are at the same potential, thereby creating a regulated voltage the same as the reference voltage across the PMOS pass device 24. Under a load transient condition, such as that seen from the DC-DC switching mode power converter, the non-inverting input to the error amplifier 22 modulates while the reference voltage remains constant. For example, as the non-inverting input drops, the error amplifier output voltage also drops, thereby turning the PMOS pass device 24 on harder to support the load current and thereby maintaining regulation.

It should be appreciated that the front end LDO regulator reduces the input supply voltage Vin ripple by pre-regulating the supply voltage to the DC-DC converter 12 with a fixed dropout linear regulator, because the output is less than the input supply voltage by the amount of the reference voltage. The linear regulator output is decoupled with the same input supply decoupling capacitor 36 as used in a conventional buck switching converter. The linear regulator is designed to have a bandwidth much lower than the chopping frequency, such that the square current waveform is drawn from the capacitor, rather than from the linear regulator. The linear regulator performs a "top-up" function, i.e., keeping the output decoupling capacitor 18 charged. With a bandwidth low enough to attenuate the chopping frequency, the rate of change of the current signal (dI/dtr) is attenuated by an even larger factor. In this invention, the linear regulator input supply current tends towards a DC value that is the average value of the square current signal. With a near DC input supply current, the ripple current is at a minimum and therefore the input supply voltage ripple is small as well.

Figure 2:
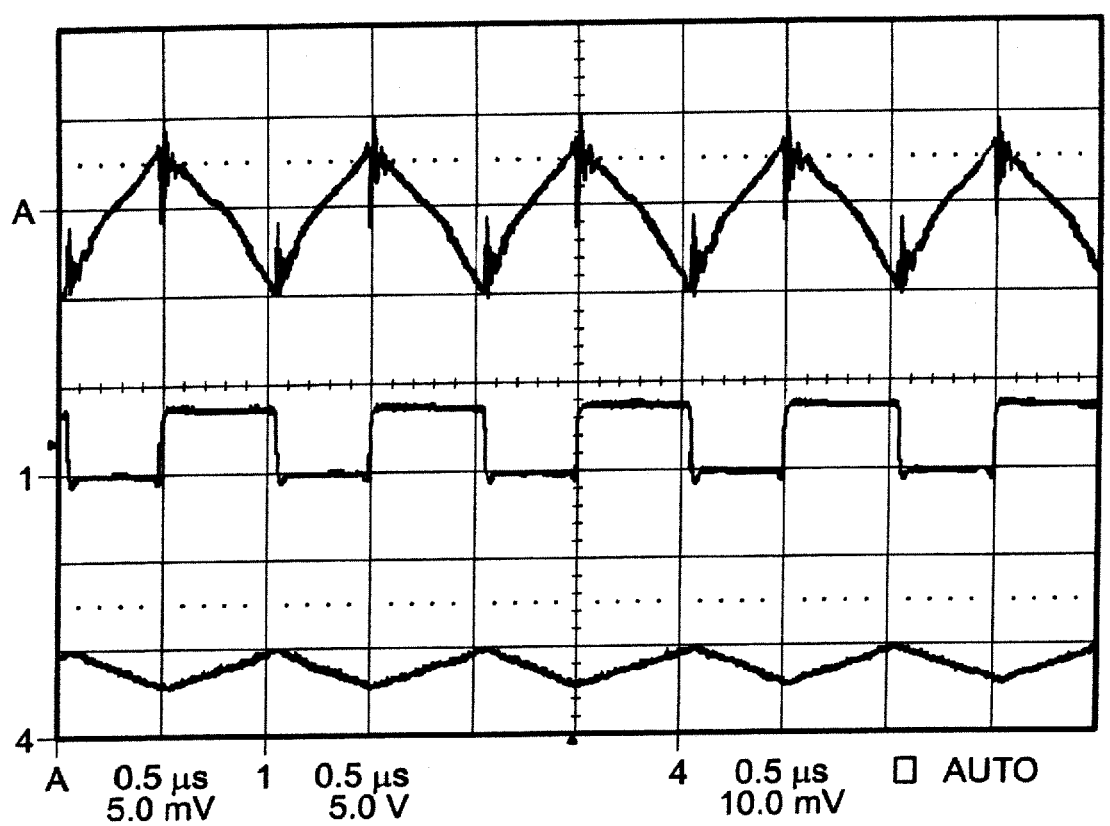
FIG. 2 is an oscilloscope screen shot depicting input supply ripple of a conventional switching mode power converter.
Figure 3:
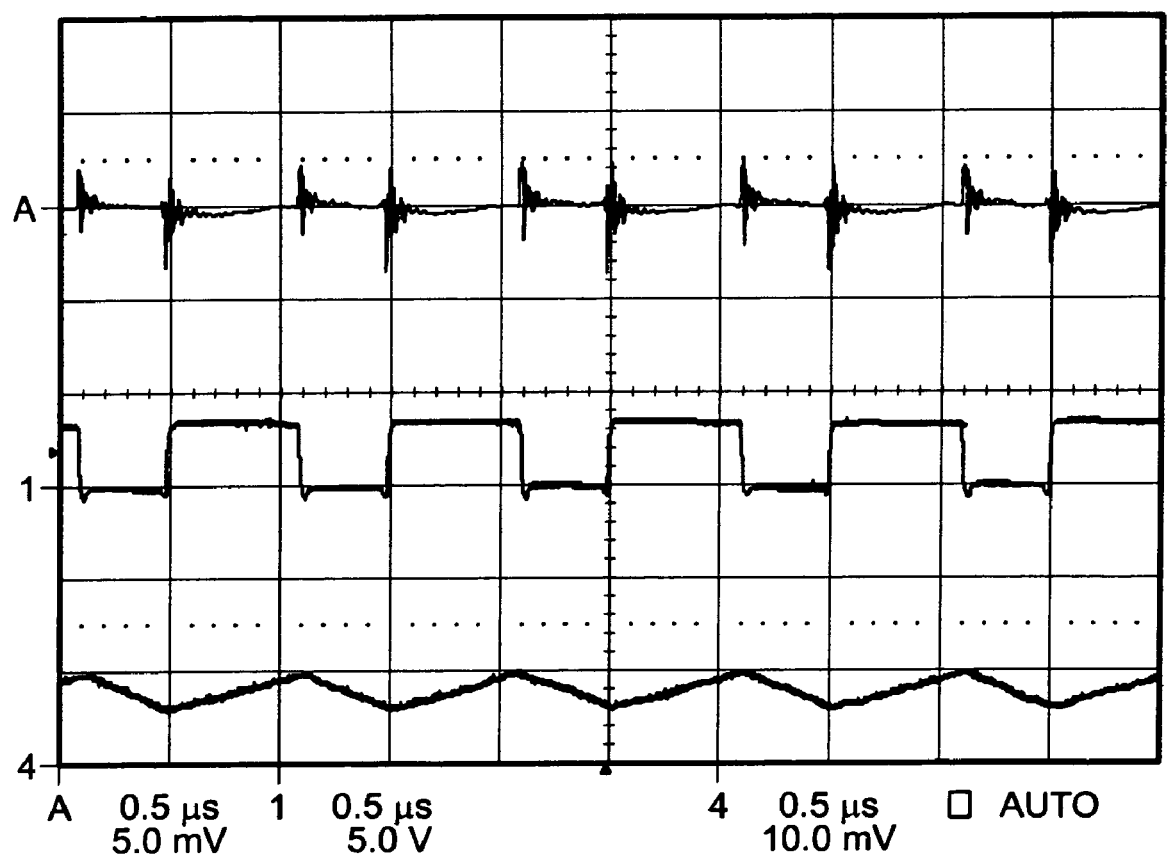
FIG. 3 is an oscilloscope screen shot depicting input supply ripple of a switching mode power converter as corrected by the front end regulator of the present invention.

FIGS. 2 and 3 show the significant improvement in input voltage Vin ripple as a result of the invention using an experimental set-up. In each figure, the upper waveform corresponds to the input voltage Vin into the front end LDO regulator, the center waveform corresponds to the pulse width modulation (PWM) signal to the DC-DC switching mode power converter, and the lower waveform corresponds to the current in the output inductor of the DC-DC switching mode power converter. Without the front end LDO regulator, the DC-DC converter 12 would present approximately 8 mV of ripple onto the supply voltage (see FIG. 2). But, the ripple is reduced significantly by use of the front end LDO regulator to less than 1 mV (see FIG. 3). The results presented in FIGS. 2 and 3 above were obtained from a sample DC-DC switching mode power converter driving a 330 mA DC load, with an output voltage of 1.8V, and input voltage of 3.6V. The results clearly show that using a front-end LDO regulator in accordance with the invention to pre-regulate the input to a buck switching converter, the input ripple can be reduced significantly compared to the input ripple achieved with a standard buck switcher converter with no front-end LDO regulator.

Having thus described a preferred embodiment of a switching mode power converter having a front end regulator to control input supply ripple, it should be apparent to those skilled in the art that certain advantages of the described method and apparatus have been achieved. It, should also be appreciated that various modifications, adaptations, and alternative embodiments thereof may be made within the scope and spirit of the present invention. The invention is defined solely by the following claims.

What is claimed is:

1. A power system, comprising:
    a front end regulator coupled to an input supply voltage (Vin) and for providing a regulated input supply voltage (Vbp) and maintaining a substantially constant voltage difference between the input supply voltage (Vin) and the regulated input supply voltage (Vbp) to thereby reduce ripple of the input supply voltage (Vin), the front end regulator comprising (1) an error amplifier for comparing the input supply voltage (Vin) and the regulated input supply voltage (Vbp) and producing an error signal used to modulate the voltage difference between the input supply voltage (Vin) and the regulated input supply voltage (Vbp) and (2) a MOS device operatively coupled to the error amplifier, the MOS device including a gate terminal for receiving the error signal, a source terminal coupled to the input supply voltage (Vin), and a drain terminal coupled to the regulated input supply voltage (Vbp); and
    a DC-DC switching mode power converter operatively coupled to the front end regulator and receiving the regulated input supply voltage (Vbp), the DC-DC switching mode power converter providing a regulated output voltage (Vout).

2. The power system of claim 1, wherein the front end regulator further comprises a low drop-out regulator.

3. The power system of claim 1, wherein the MOS device further comprises a PMOS pass device.

4. The power system of claim 1, further comprising a reference voltage with respect to the input supply voltage (Vin) coupled to an inverting input of the error amplifier.

5. A method for reducing ripple of a source input supply voltage (Vin) to a DC-DC switching mode power converter, comprising the steps of:
    regulating the source input supply voltage (Vin) to provide a regulated input supply voltage (Vbp);
    providing the regulated input supply voltage (Vbp) to the DC-DC switching mode power converter;
    comparing the source input supply voltage (Vin) to the regulated input supply voltage (Vbp) and providing a corresponding error signal;
    coupling the error signal to a gate terminal of a MOS pass device. coupling the input supply voltage (Vin) to a source terminal of the MOS pass device, and coupling the regulated input supply voltage (Vbp) to a drain terminal of the MOS pass device; and
    modulating a voltage difference between the input supply voltage (Vin) and the regulated input supply voltage (Vbp) in accordance with the error signal.

6. The method of claim 5, wherein the comparing step further comprises coupling the input supply voltage (Vin) and the regulated input supply voltage (Vbp) to respective input terminals of an error amplifier.

7. The method of claim 6, wherein the comparing step further comprises coupling a reference voltage with respect to the input supply voltage (Vin) to an inverting input terminal of the error amplifier.

* * * * *